March 15, 1966

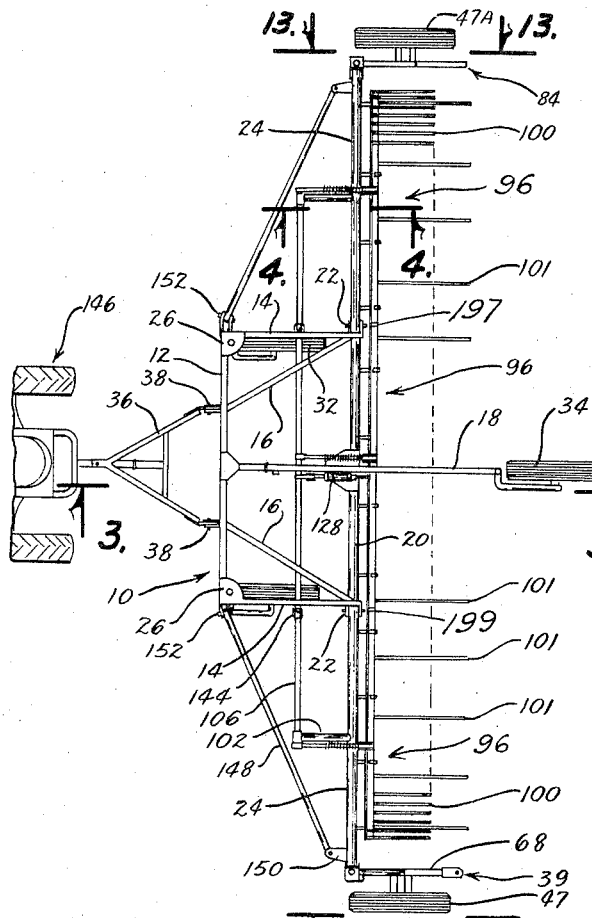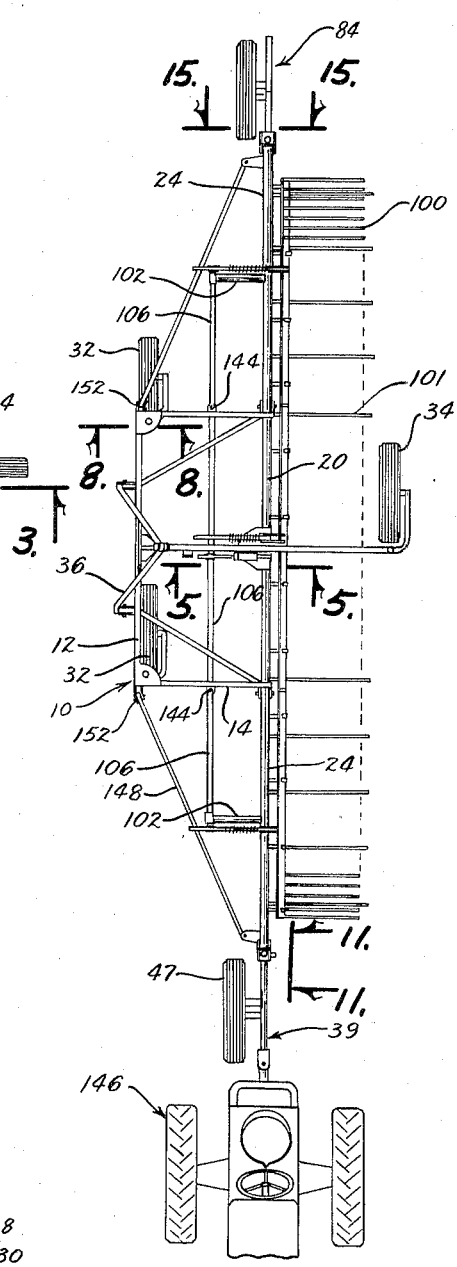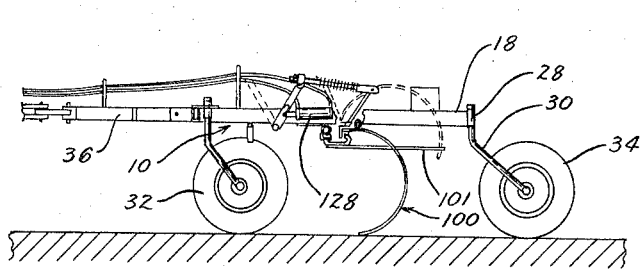

F. E. ROWSE 3,240,005

HAY RAKE

Filed May 5, 1964

INVENTOR
FREEMAN E. ROWSE
BY
Dick & Farley
ATTORNEYS

March 15, 1966  F. E. ROWSE  3,240,005
HAY RAKE
Filed May 5, 1964  3 Sheets-Sheet 3
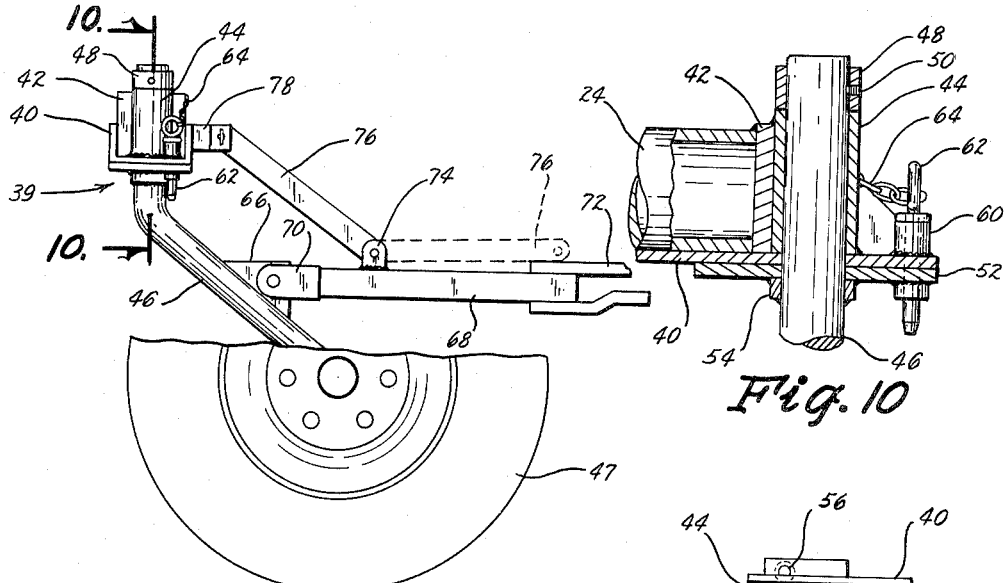
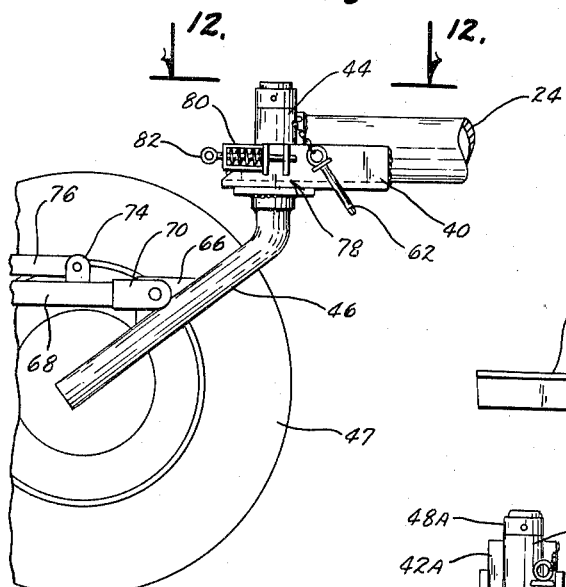
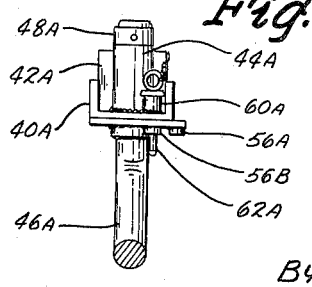
INVENTOR
FREEMAN E. ROWSE
BY
Dick & Zarley
ATTORNEYS United States Patent Office 3,240,005
Patented Mar. 15, 1966

3,240,005
HAY RAKE
Freeman E. Rowse, Burwell, Nebr.
Filed May 5, 1964, Ser. No. 365,046
2 Claims. (Cl. 56—386)

Among the problems which are inherent with hay rakes is the difficulty in transporting an elongated rake unit when it is not in use. Further problems relate to the ability of an elongated rake to compensate for irregularities in the ground surface during the raking operation, and the task of raising and lowering rake sections becomes increasingly complex as the length of the rake is increased.

Therefore, a principal object of this invention is to provide a hay rake device that can be easily and quickly transferred from a transverse operative position to a longitudinal transport position.

A further object of this invention is to provide a hay rake device which will permit the rake sections to be easily and quickly raised or lowered.

A still further object of this invention is to provide a rake device that is supported on a wheel mounted frame that easily "floats" with respect to variations in terrain.

A still further object of this invention is to provide a hay rake that will not be subject to breakage upon encountering obstacles with the rake tines.

A still further object of this invention is to provide a rake device that is economical of manufacture, durable in use and refined in appearance.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

FIGURE 1 is a plan view of the hay rake of this invention in its operating position;

FIGURE 2 is a plan view of the hay rake of this invention in its transport position;

FIGURE 3 is a sectional view of the hay rake taken on line 3—3 of FIGURE 1 with the dotted lines of this figure depicting the tines in their elevated position;

FIGURE 9 is an end elevational view of one end wheel support with portions thereof partially cut away to more fully illustrate the construction, and this figure is taken on line 9—9 of FIGURE 1;

FIGURE 10 is an enlarged scale sectional view of the wheel supporting structure of FIGURE 9 as viewed on line 10—10 of that figure;

FIGURE 11 is an elevational view of the end wheel shown in FIGURE 9 when the wheel is in its transport position, and this figure is taken on line 11—11 of FIGURE 2;

FIGURE 12 is a top elevational view of the wheel support shown in FIGURE 11 as viewed on line 12—12 of FIGURE 11;

FIGURE 13 is a sectional view of the other end wheel supporting means as viewed on line 13—13 of FIGURE 1;

FIGURE 14 is a top plan view of the structure of FIGURE 13 as viewed on line 14—14 of FIGURE 13; and FIGURE 15 is a partial sectional view of the rearward wheel supporting means when the unit is in its transport position and this figure is taken on line 15—15 of FIGURE 2.

Figure 5:
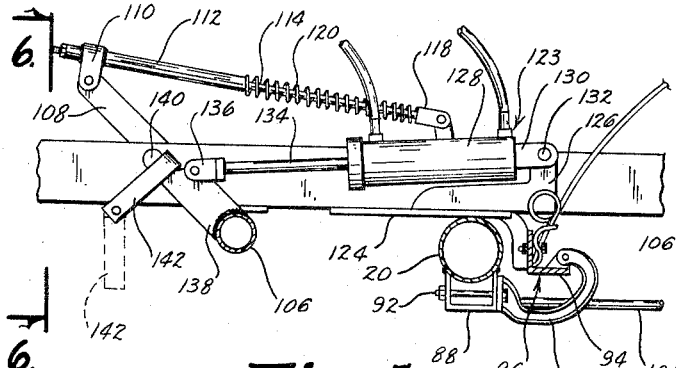
FIGURE 5 is a sectional view of the hay rake taken on line 5—5 of FIGURE 2 and depicts the power mechanism for raising and lowering the tine elements and depicts the tine elements in their elevated position.
Figure 6:
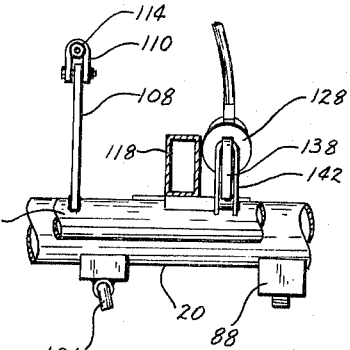
FIGURE 6 is a partial sectional view of the structure depicted in FIGURE 5 as viewed on line 6—6 of FIGURE 5.

The numeral 10 designates a rectangular frame which is comprised of a front member 12 and parallel side members 14 which are secured to the opposite ends of the front member 12. Diagonal braces 16 extend between the rearward ends of members 14 to the central portion of the front member 12. A center frame member 18 bisects frame 10 and extends rearwardly from the center of front member 12 and protrudes rearwardly in cantilever fashion from the frame 10 as shown in FIGURES 1 through 3. A rear beam 20 of tubular construction or the like extends laterally across the rectangular frame 10 and is rigidly secured to the rearward ends of said members 14. Clevis elements 22 are secured in any convenient fashion to the outer side ends of side members 14, and these elements 22 effect a pivotal connection between the frame 10 and the outwardly extending side beam 24. Side beams 24 are of similar construction to rear beam 20, and as shown in FIGURES 1 and 2, the beam members 20 and 24 are normally in longitudinal alignment.

Figure 8:
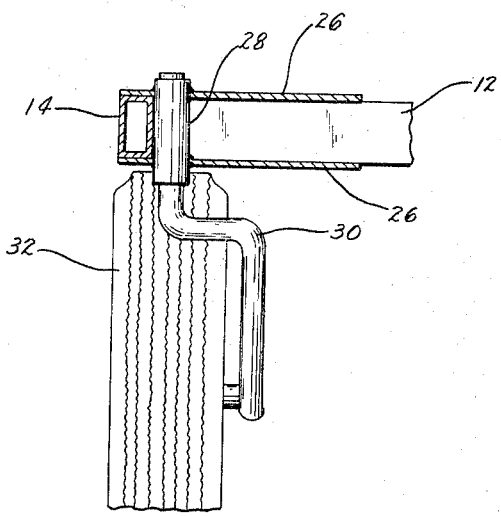
FIGURE 8 is a partial sectional view of the hay rake frame as viewed on line 8—8 of FIGURE 2 and illustrates a forward caster wheel support.

With reference to FIGURES 1 and 8, plates 26 are welded or otherwise secured to the forward corners of frame 10 and a bearing sleeve 28 extends through plates 26 in a vertical direction and is welded to the plates. A caster axle 30 has its upper end pivotally mounted within sleeve 28 in conventional fashion. The caster axle 30 preferably extends vertically downwardly from the sleeve 28, thence in a lateral direction, and thence in a downward angular direction wherein it is then rotatably secured to a front caster wheel 32. The position of front wheels 32 with respect to frame 10 is determined by the direction that the frame is being towed as will be described hereafter. As shown in FIGURES 1 through 3, a bearing sleeve 28 is secured to the rearward end of center frame member 18 and a caster axle 30 is mounted therein. A rear caster wheel 34 is secured to the lower end of this rearward caster axle and this rearward wheel 34 is identical in all respects to the forward wheels 32. A tongue 36 is pivotally secured to the front member 12 of frame 10 by hinges 38 and is adapted to pivot between a horizontal position and an upwardly and rearwardly extending position which is depicted in FIGURE 2.

A lead wheel assembly 39 is secured to the outer end of one of the side beams 24 as illustrated in FIGURES 1, 2, and 9 through 12. Lead wheel assembly 39 includes a U-shaped channel 40 which is welded to the outer end of a side beam 24 and extends slightly beyond the outer end thereof. A vertical plate 42 is positioned within the U-shaped channel 40 and is welded to the outer end of the beam 24. A sleeve 44 is welded in a vertical position to the vertical plate 42 and to the inside bottom of the channel 40. An axle 46 has its upper end extending through a hole in the bottom of channel 40 which registers with the lower end of sleeve 44 and the axle 46 is rotatably mounted within the sleeve. As shown in FIGURE 9, the axle is vertically disposed at its upper portion but is angularly disposed at its lower portion and its lower end is rotatably secured to a lead wheel 47. A sleeve 48 embraces the upper end of axle 46 as it extends upwardly from sleeve 44 and a set screw 50 in sleeve 48 prevents the axle from moving downwardly with respect to the sleeve 44.

A horizontal plate 52 has a opening that registers with the opening in the bottom of channel 40 and sleeve 54 surrounds this opening and is welded to the plate 52. The sleeve 54 also embraces the axle 46 and is welded thereto. This structure is clearly shown in FIGURE 10. The plate 52 and the sleeve 54 rotate with the axle 46 and hence, plate 52 is adapted to rotate against the bottom of the U-shaped channel 40.

A hole 56 in plate 54 is adapted to register at times with the hole 58 in the bottom of channel 40 when the axle 46 is disposed with respect to the side beam 24 as depicted in FIGURES 1, 9 and 10. A bushing 60 is welded to the U-shaped channel 40 around the hole 58 and pin 62 is adapted to extend through the registering holes 56 and 58 to maintain the axle 46 in the position shown in FIGURE 1 of the drawings. The pin in chain 64 interconnects pin 62 and plate 42 to prevent the pin from being inadvertently lost.

A plate 66 is welded to the diagonally disposed portion of axle 46 as shown in FIGURE 9. A tongue member 68 is pivotally secured to plate 66 by clevis means 70, and a drawbar clevis means 72 is secured to the opposite end of the tongue member. Ears 74 extend upwardly from tongue member 68 and stabilizer bar 76 is pivotally secured between ears 74 by a pin or other convenient means. A U-shaped bracket 78 is welded or otherwise secured to one side of U-shaped channel 40 and a spring loaded pin means is secured thereto and includes pin 82 which is adapted to selectively extend through registering apertures in the bracket 78. The withdrawal of pin 82 from between the depending elements of the bracket 78 permits the outer free end of the stabilizer bar 76 to dwell within the bracket, and the pin 82 is thereupon permitted to extend through an aperture in the upper end of the stabilizer bar to selectively and detachably secure the upper end of the stabilizer bar to the bracket 78. The spring loaded pin means is only one of several convenient structural elements that could be employed to effect the connection between the stabilizer bar and the bracket.

In FIGURES 13 through 15, the details of the trailing wheel assembly 84 are shown. The trailing wheel assembly is essentially identical to the lead wheel assembly 39 and corresponding parts of the trailing wheel assembly have been assigned identical numerals to corresponding parts in the lead wheel assembly with the suffix "A" added thereto. Horizontal plate 52A in the trailing wheel assembly has a second hole 56B therein to permit the axle 46A to be pinned in two different positions, namely, the operating position depicted in FIGURE 1 and the transportation position illustrated in FIGURE 2. As shown in FIGURE 13, a hay retaining bar 86 is horizontally disposed and is welded by one of its ends to the diagonally extending portion of axle 46A. The tongue 68 on lead wheel assembly 39 and the bar 86 on the trailing wheel assembly 84 serve to prevent lateral movement of the hay with respect to the tines of the rake unit when the wheel assemblies are pinned in their operating position as illustrated in FIGURE 1.

Figures 4, 7:
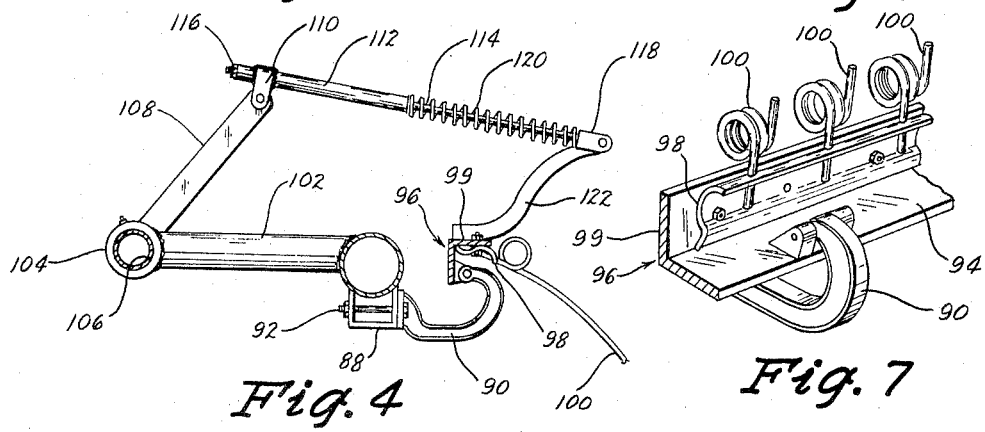
FIGURE 4 is a partial sectional view of the hay rake taken on line 4—4 of FIGURE 1, and depicts a portion of the tine supporting apparatus when the tines are in their lower position.
FIGURE 7 is a partial perspective view of the tine supporting apparatus.

As shown in FIGURES 4, 5 and 7, a plurality of channel brackets 88 are welded or otherwise secured in spaced apart relation to the beams 20 and 24 on the bottom portions thereof. A plurality of arcuate-shaped hangers 90 are bolted to the rearward flange of the channel brackets 88 by bolts 92. As clearly shown in FIGURES 4 and 5, the hangers 90 extend rearwardly from the brackets, and then are turned upwardly and thence slightly forwardly with the outer free ends thereof being pivotally secured by any convenient means to the flange 94 of elongated angles 96. An individual angle 96 is positioned rearwardly of beams 20 and beams 24. It can be seen that the central angle 96 terminates at 197 and 199. An S-shaped bracket 98 is bolted or otherwise secured to the flange 99 of angle 96 and the ends of a plurality of spring loaded tines 100 extend through aligned apertures in the bracket 98 as shown in FIGURE 7. As shown in FIGURE 3, the tines 100 are substantially semi-circular in shape. As shown in FIGURES 1 and 2, a plurality of rearwardly extending spaced apart parallel cleaning rods 101 are secured by their forward ends to the underneath side of the beams 20 and 24 so as to force the hay out of the tines as the tines are being raised in a manner to be described hereafter.

Each of the beams 20 and 24 have a horizontally disposed forwardly extending bar 102 welded thereto as illustrated in FIGURE 4. A bearing ring 104 is secured to the forward ends of bars 102 to rotatably receive a horizontally disposed jack shaft 106. Upwardly extending bars 108 are welded at their lower ends to jack shaft 106, and the upper ends thereof terminate in a clevis 110 which is pivotally secured to the upper end of the bar 108 in any convenient manner. A hollow tube 112 extends through clevis 110 and the tube is welded to the clevis adjacent the forward end of the tube. An elongated rod 114 extends from the forward end of tube 112 to a point substantially rearwardly of the tube, and nut 116 is threadably mounted on the forward end of rod 114 to bear against the forward end of tube 112 to prevent rearward displacement of the rod through the tube. Rod 114 terminates in clevis means 118 and spring 120 embraces the rearward portion of rod 114 and has its rearward end bearing against the clevis 118 and its forward end bearing against the rearward end of tube 112. Clevis 118 is pivotally secured in any convenient manner to the upper end of S-shaped arm 122 which has its lower end welded or otherwise rigidly secured to the flange 99 of angle 96. As shown in FIGURE 4, the flange 94 of angle 96 is in a vertical position when the tines 100 are in their downward operating position, and the flange 99 of angle 96 is in a horizontal position at this same time. When jack shaft 106 is rotated forwardly in a manner to be described hereafter, the bar 108 moves forwardly pulling with it the tube 112, the rod 114, and the upper end of S-shaped arm 122. This causes the angle 96 to rotate from the position shown in FIGURE 4 to the position shown in FIGURE 5. This action causes the tines 100 to rotate from the position shown by the solid lines in FIGURE 3 to an upward inoperative position shown by the dotted lines in this same figure. The power means 123 for rotating the jack shaft 106 is best shown in FIGURE 5. A bracket plate 124 is welded or otherwise secured to center frame member 18 at the rearward center portion of frame 10. Bracket plate 124 includes an upstanding flange 126. Cylinder 128 of the conventional double acting hydraulic design has a rearwardly extending ear 130 which is pivoted to flange 126 by pin 132. A forwardly extending piston rod 134 terminates in clevis 136 which in turn is pivoted by any convenient means to power link 138. The lower end of link 138 is welded to the jack shaft 106. An upwardly extending finger 140 on link 138 is adapted to be inserted into latch means 142 which is of U-shaped construction and which is pivoted by any convenient means to the lower side portion of center frame member 18. It should be noted that jack shaft 106 is comprised of a center portion and two end portions which are interconnected by universal joints 144. The center portion of jack shaft 106 is secured by suitable bearing means (not shown) to the bottom of frame 10. When the device of this invention is to be used in the hay raking operation, it is assembled in the manner depicted in FIGURES 1 and 2. This is accomplished by actuating the pins 62 and 62A on the end wheel assembly 39 and 84, respectively, so that the wheel assemblies are pinned at right angles to the beams 24 as depicted in FIGURE 1. The tongue 36 on the forward portion of frame 10 is secured in conventional fashion to the drawbar of tractor 146. Hydraulic cylinder 128 is operated by conventional means through the hydraulic hoses secured to its upper and lower ends. During the hay raking operation, the latch means 142 is released from the finger 140 on link 138 and hangs in the inoperative position shown by the dotted lines in FIGURE 5. Hydraulic pressure is introduced into the top or forward end of cylinder 128 to withdraw piston rod 134 back into the cylinder. This causes the link 138 and shaft 106 to rotate in a clockwise direction as viewed in FIGURE 5. As discussed above, this rotation of shaft 106 causes a corresponding rotation in bar 108 and effects the lowering of the tines 100 to the position shown in FIGURE 4.

The tractor then pulls the unit through the hay field in the assembled condition shown in FIGURE 1. As the tines 100 are gathering hay, the bar 86 on wheel assembly 84 and the tongue 68 on wheel assembly 39 prevent any hay from moving laterally outwardly from the tines 100. The frame 10 is supported by the three caster wheels 32, 33 and 34, and this three-wheeled support permits the unit to easily adapt itself for variations in in terrain. Since the outer ends of jack shaft 106 are universally connected to the central portion thereof, and since the beams 24 are pivotally secured to the frame 10, the extreme ends of the unit can also adapt to variations in terrain elevation for the extreme ends of the unit can pivot upwardly or downwardly with respect to the frame 10. This action is facilitated by diagonal braces 148 which are pivotally secured in a horizontal direction at their outer ends to the outer ends of beams 24 by means 24 by means of clevis 150, and are pivotally secured in an equal direction to the forward corners of frame 10 by means of clevis 152.

The tines 100 can be raised from the position shown by the solid lines in FIGURE 3 to the position shown by the dotted lines in that same figure by introducing hydraulic pressure into the bottom or rearward end of cylinder 128 which causes a forward extension of the piston rod 134. This serves to rotate shaft 106 through link 138 from the position shown in FIGURE 4 to the position of FIGURE 5, which in turn serves to effect a corresponding pivotal change in the position of angle 96 which effects the raising of the tines. As the tines are raised upwardly past the rods 101, the rods serve to pull the hay from the tines.

In the event that the tines 100 engage an obstruction during the hay raking operation, the obstruction will tend to cause the tines to rotate upwardly, and will cause a corresponding counter-clockwise rotational thrust on arms 122 as viewed in FIGURE 4. Some of this impact will be absorbed by the spring characteristics of the tines themselves, but some limited counter-clockwise rotation of the arm 122 will be permitted even though bar 108 remains in a stationary condition, and this is accomplished by means of the spring 120. The spring 120 is compressed as this impact force causes the counter-clockwise rotation of arm 122, which in turn serves to thrust the rod 114 forwardly through the tube 112. Limited movement of the rod 114 through tube 112 is permitted by compression of the spring 120. As a result, the tines 100 are permitted to be elevated slightly upon engaging an obstruction during the raking operation, but the force of such obstruction is absorbed by the spring 120 without causing any injury to the elevational control means of the rake assembly.

When it is desired to transport the hay rake of this invention from one place to another in an inoperative condition, the tines are raised in the manner indicated and the latch means 142 is placed over the finger 140 on link 138 as illustrated in FIGURE 5. This permits the piston rod 134 to be mechanically held in its extended position and it relieves the stress and strain on the piston rod 134 and the entire hydraulic system. During the hay raking operation, the lead wheel assembly 39 is in the position depicted in FIGURE 9. To permit the wheel assembly 39 to be transformed to the transport position, the pin 82 is withdrawn to a retracted position to release the upper end of stabilizer bar 76 from the bracket 78. The stabilizer bar 76 can then be pivoted to the position shown by the dotted lines in FIGURE 9 or to the position of the solid lines in FIGURE 11. The tractor 146 can be disengaged from the tongue 36 and the tongue 36 is then moved to an upwardly extending pivotal position illustrated in FIGURE 2. The tractor 146 is thereupon secured by conventional means to the clevis element 72 on the outer end of tongue 68 of the wheel assembly 39.

With regard to the trailing wheel assembly 84, the pin 62A is withdrawn from the bushing 60A, as these components are illustrated in FIGURE 13, and a slight forward movement by the tractor 146 (FIGURE 2) will cause the trailing wheel 47A to move to the trailing position of FIGURE 2. The wheel assembly 84 can then be pinned in this traveling position by reinserting the pin 62A through the bushing 60A which is then aligned with the hole 56B in plate 52A. (See FIGURE 15.) The rotation of the trailing wheel assembly 84 from the raking position to the traveling position can be affected manually without drawing the entire unit forwardly (FIGURE 2), but in any event, it is desirable to have the trailing wheel assembly 84 pinned in the position shown in FIGURE 2 for transportation purposes.

As the tractor proceeds forwardly (FIGURE 2), the caster wheels 32 and 34 on frame 10 automatically assume the position in FIGURE 2.

Thus, it is seen from the foregoing that this invention will accomplish at least all of its stated objectives.

Some changes may be made in the construction and arrangement of my hay rake without departing from the real spirit and purpose of my invention, and it is my intention to cover by my claims, any modified forms of structure or use of mechanical equivalents which may be reasonably included within their scope.

I claim:

1. In a hay rake device,
   a first frame portion having rearward and forward ends and opposite sides,
   first and second caster wheel assemblies freely rotatably mounted about a vertical axis in a spaced apart relation on the forward portion of said first frame portion adjacent its opposite sides,
   a center frame member extending rearwardly from the center of said first frame portion,
   a third caster wheel assembly freely rotatably mounted about a vertical axis on the rearward end of said center frame member,
   a second frame portion having rearward and forward ends and opposite sides and being pivotally connected about a horizontal axis at one of its sides to one side of said first frame portion,
   a fourth caster wheel assembly rotatably mounted about a vertical axis on the other side of said second frame portion at a point rearwardly of said first and second caster wheel assemblies and forwardly of said third caster wheel assembly,
   a third frame portion having rearward and forward ends and opposite sides and being pivotally connected about a horizontal axis at one of its sides to the other side of said first frame portion,
   a fifth caster wheel assembly rotatably mounted about a vertical axis on the other side of said third frame portion at a point rearwardly of said first and second caster wheel assemblies and forwardly of said third caster wheel assembly,
   a tongue means pivotally connected about a horizontal axis to the forward end of said first frame portion to facilitate the movement of said first, second and third frame portions in one direction,
   a tongue member secured to one of said fourth and fifth caster wheel assemblies to facilitate the movement of said first, second and third frame portions in a second direction transverse to said one direction, and locking means selectively locking said fourth and fifth caster wheel assemblies in a position parallel to said one direction.

2. The hay rake device of claim 1 wherein said first, second and third frame portions have first, second and third elongated members rotatably secured about a horizontal axis to their rearward ends thereof respectively, said first, second and third elongated members being adapted to support a plurality of tines thereon.

References Cited by the Examiner

UNITED STATES PATENTS

| | | | |
|---|---|---|---|
| 1,502,507 | 7/1924 | Link | 56—385 |
| 1,815,330 | 7/1931 | Robinson | 172—310 |
| 1,927,458 | 9/1933 | Klise | 172—311 X |
| 1,963,426 | 6/1934 | Taylor | 280—411 |
| 2,229,653 | 1/1941 | Hohl | 280—415 X |
| 2,645,891 | 7/1953 | Berkley | 56—386 X |
| 2,658,770 | 11/1953 | Koenig | 280—415 X |
| 2,672,721 | 3/1954 | Adams | 56—384 |
| 2,778,182 | 1/1957 | Malmgren | 280—411 |
| 2,867,966 | 1/1959 | Adams | 56—384 |

FOREIGN PATENTS

| | | |
|---|---|---|
| 645,292 | 7/1962 | Canada. |
| 1,008,597 | 2/1952 | France. |
| 576,144 | 5/1933 | Germany. |
| 691,526 | 5/1953 | Great Britain. |

ABRAHAM G. STONE, *Primary Examiner.*

RUSSELL R. KINSEY, T. GRAHAM CRAVER,
*Examiners.*